Dec. 15, 1964    G. E. JANSSEN    3,161,269
CAM OPERATED CLUTCH FOR FORAGE WAGONS
Filed Dec. 3, 1962    3 Sheets-Sheet 1

INVENTOR.
GAIL E. JANSSEN
BY
Lieber & Nilles
ATTORNEYS

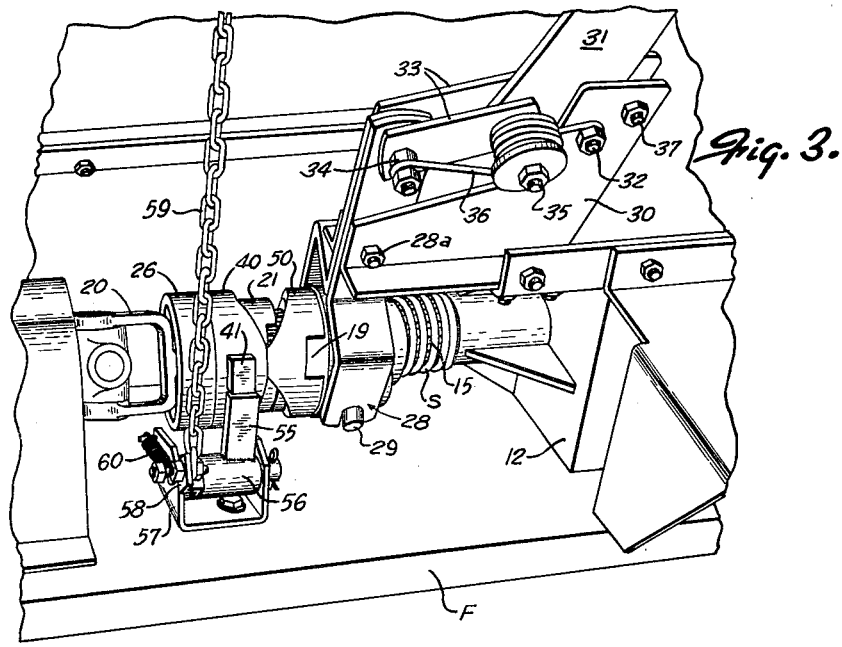
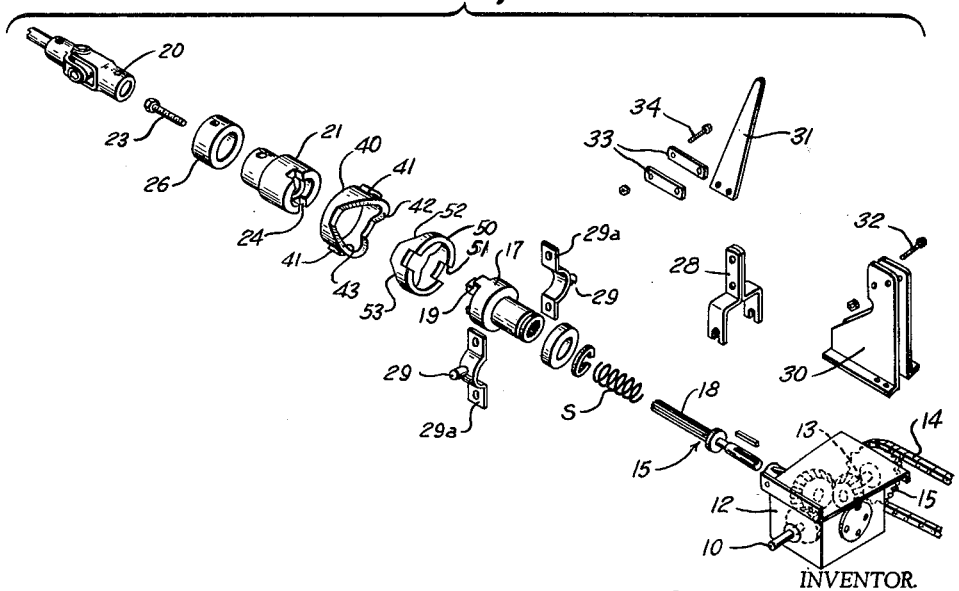

INVENTOR.
GAIL E. JANSSEN

United States Patent Office 3,161,269
Patented Dec. 15, 1964

3,161,269
CAM OPERATED CLUTCH FOR FORAGE
WAGONS
Gail E. Janssen, West Bend, Wis., assignor to Gehl Bros.
Manufacturing Co., West Bend, Wis., a corporation of
Wisconsin
Filed Dec. 3, 1962, Ser. No. 241,971
5 Claims. (Cl. 192—24)

This invention relates generally to self-unloading forage wagons of the type which have driven beaters, conveyors, or other moving parts which act to forcedly discharge the material from the wagon. More particularly, the invention relates to a safety device for declutching the drive to certain of these moving parts, so as to quickly stop the inherently dangerous moving parts whenever necessary.

Safety devices of this nature are in use today, and while they have operated with a certain degree of success, they do have certain shortcomings. For example, some of them make it necessary to stop the prime mover entirely before the drive can again be re-engaged. This is time consuming, particularly when it is appreciated that the declutching mechanism may often be accidentally tripped, for example, by a bale of hay being thrown into the wagon.

Accordingly it is an object of the present invention to provide a declutching device which can be instantly reset once it has been disengaged, and without the necessity of stopping the power source. A more limited aspect of the present invention relates to the specific structure for causing this interruption in the power transmission.

The device provided by the present invention can be operated quickly and simply by one hand of the operator and from any one of a number of positions adjacent the front end of the wagon, but at the same time the declutching device is not susceptible to accidental operation.

These and other objects and advantages of the present invention will appear later as this disclosure progresses, reference being had to the accompanying drawings in which:

FIGURE 3 is a view similar to FIGURE 2 but showing the clutch in the disengaged position;

FIGURE 4 is an exploded, perspective view of certain of the clutch and cam members;

Figure 1:
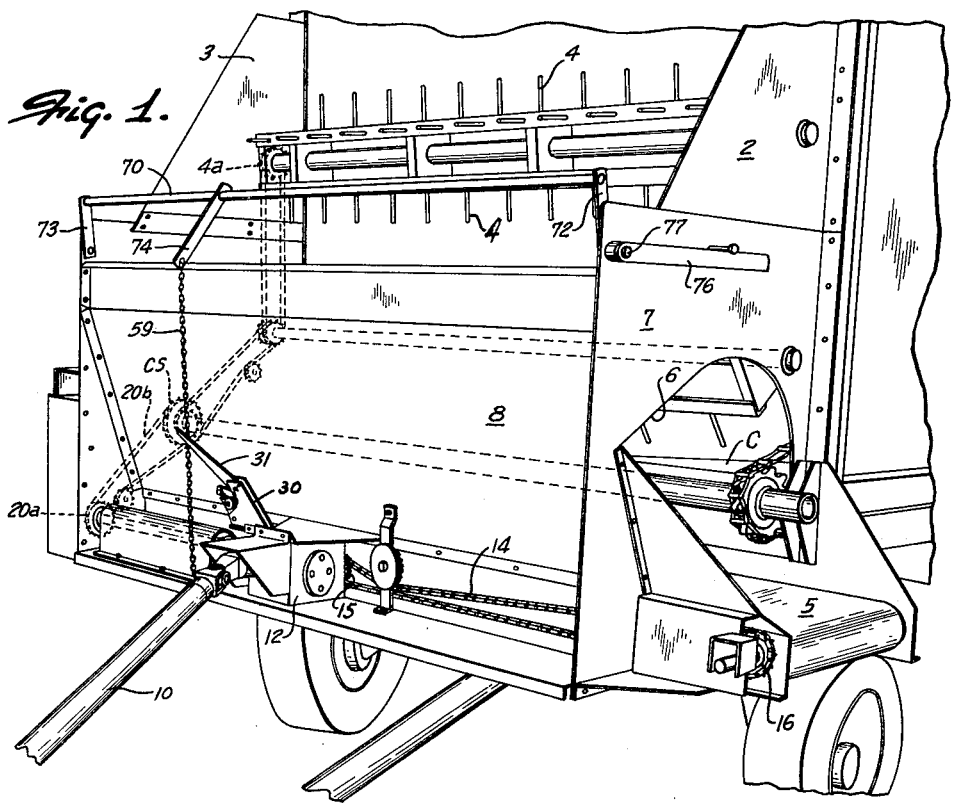
FIGURE 1 is a perspective view of a wagon embodying the present invention, the view being taken generally from the front end of the wagon.

Referring more particularly to the drawings, the wagon includes the two sides 2 and 3 between which are rotatably mounted the beaters 4. These beaters are positively driven and act to forcedly tear the material apart and move it into the forward transverse conveyor 5. The conveyor 5 is shown as being of the endless belt type which conveys the material through the opening 6 in the end 7 of the transverse trough 8. It should be noted that the beater rotates rapidly and is aggressive in its action and because of its proximity to the open front end of the wagon, it is an inherently dangerous part of the machine. Due to the nature of the unloading operation it is often necessary for the operator to stand adjacent the front end of the wagon and in order to clear an obstruction from the various moving parts it is quite a temptation for the operator to place his hand or arm in proximity to them.

Notwithstanding the numerous warnings to the contrary, some operators in attempting to clear or adjust the parts will place his hand in proximity to them and thus become entangled, which often results in serious bodily harm. When this occurs, it is extremely important to be able to immediately stop the pertinent parts of the machine.

The power for driving the various parts of the machine above described is delivered by the power take-off shaft 10 which is connected in the conventional manner with a tractor (not shown).

Of course other suitable power sources may be used, such as a dependent internal combustion engine, but in any event power is furnished to the right angle gear box 12. Gear box 12 has a rearwardly extending shaft 13 which, through the chain 14 and suitable sprockets 15 and 16, acts to drive the conveyor 5. As this belt is located in relatively safe place, there is no need to stop its operation by the declutching mechanism about to be described. Therefore this endless belt continues to operate and clear the trough 8, even though the beaters may be temporarily stopped.

Extending laterally from the gear box 12 is a first drive shaft 15 having a clutch element 17 slidably splined on its free end. This element includes a pair of axially extending teeth 19. A secondary power shaft 20 is in coaxial alignment with shaft 15 and is drivingly engageable and disengageable therewith by means to be described.

Shaft 20 extends through one wall of the wagon and its protruding end is connected in driving relationship with the beater 4 and the longitudinal conveyor C in the wagon bottom. More specifically, shaft 20 has a sprocket 20a (FIGURE 1) on its outer end which is connected by the endless roller chain 20b to the beater 4 and conveyor C through their respective sprockets 4a and CS.

Shafts 15 and 20 may be disengaged in either one of two ways, as follows.

Shaft 20 has a clutch element 21 fixed at its free end and in opposing relationship to clutch element 17. The shaft 15 has a splined end pilot portion 18 which extends into a counterbore 22 in the element 21 and is held therein by a cap screw 23 threaded into the end of portion 18. Thus the shafts are held in coaxial alignment but can rotate relative to one another.

Element 21 has diametrically opposed and radially extending recesses 24 with which the teeth 19 are engageable.

An axial thrust absorbing collar 26 is secured to shaft 20 by a bolt means 27 extending therethrough.

A spring S acts between the gear box 12 and element 17 to urge the latter into the engaged position.

The clutch may be actuated in a conventional manner by a shifting yoke 28 which engages the pins 29 extending laterally from a bracket 29a secured to element 17, the yoke being pivotally mounted on bolt means 28a in the upper end of the bifurcated bracket 30 of the machine frame. A handle 31 is pivotally mounted in the bracket 30 by bolt means 32. A connecting link 33 is pivotally connected between the upper end of the yoke, by bolt 34, and the handle, by bolt means 35. A spring 36 mounted on bolt means 35 has its ends secured to bolt means 32 and 34, respectively, and acts to urge the handle to the right (as viewed in FIGURES 2 and 3) and against a stop bolt means 37.

The handle is usually used to start the drive to the wagon parts at the beginning of the operation, or to interrupt the drive whenever desired. When the clutch is disengaged by the means to be presently described, however, the handle swings partially to the right automatically, and in that case the spring 36 acts to continue urging the handle to its overcenter position against the stop 37.

The second means for declutching the shafts in accordance with the present invention will now be described.

A stop cam 40 of tubular form is rotatably mounted on the periphery of the element 21 and can rotate relative thereto. Cam 40 abuts against the thrust collar 26 and has a pair of lugs 41 secured at circumferentially spaced locations on its periphery. Cam 40 also has inclined surfaces 42 and 43 along that side adjacent to clutch element 17.

A throw-out cam 50 also of tubular form is mounted for rotation on and limited movement relative to the element 21. Cam 50 has a pair of axially opening recesses 51 which are engageable by teeth 19. The cam 50 also has inclined edge surfaces 52 and 53 which are complementary to and are abuttable against the respective inclined surfaces 42 and 43 of cam 40.

Figure 2:
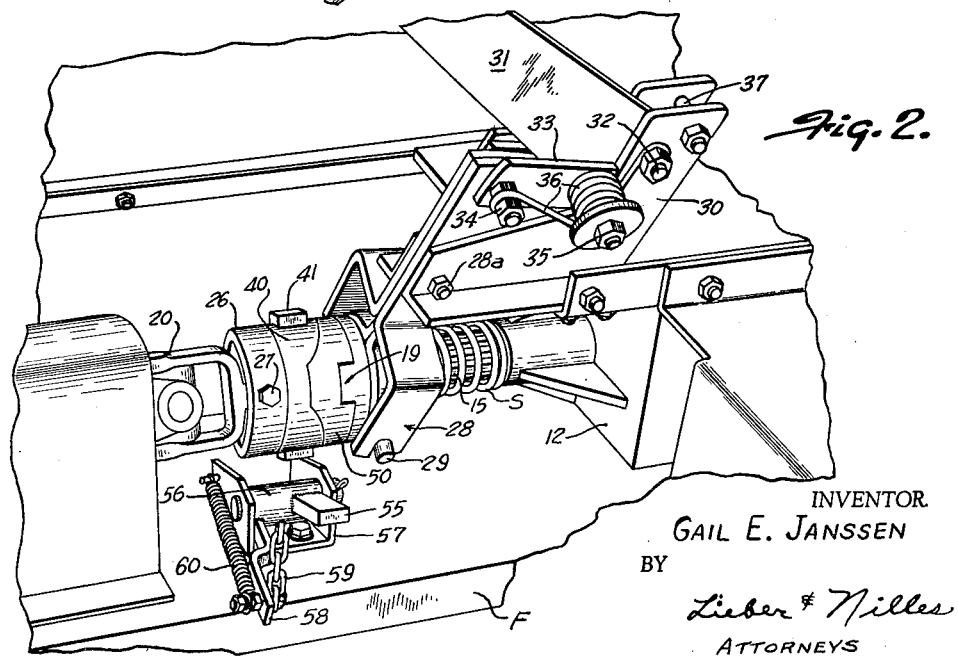
FIGURE 2 is a perspective view of the declutching mechanism as shown in FIGURE 1, but on an enlarged scale, and taken generally from the front, central portion of the wagon, and showing the clutch-engaged position.
Figure 5:
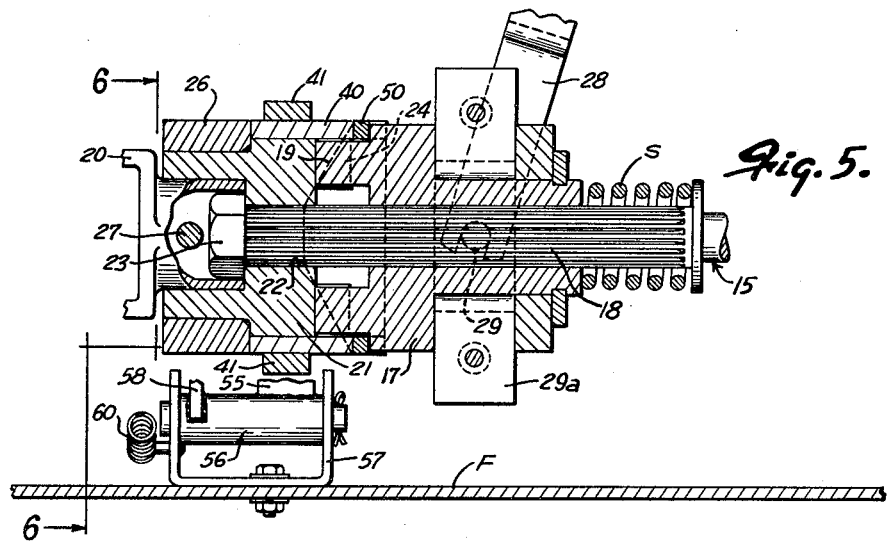
FIGURE 5 is a longitudinal view through the clutch and cam members.
Figure 6:
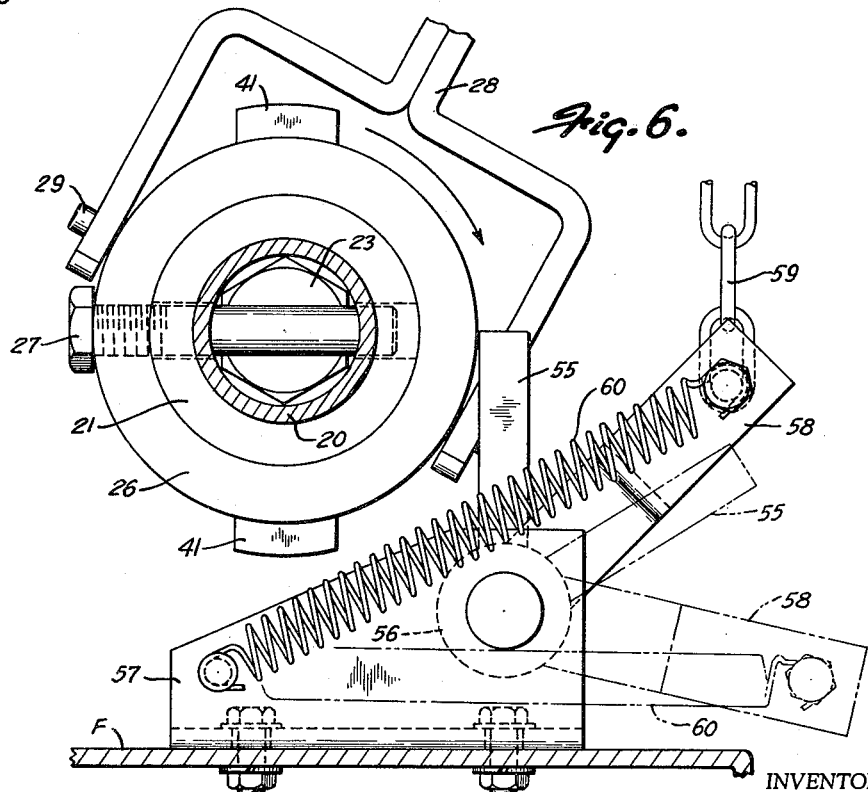
FIGURE 6 is a vertical sectional view taken generally along line 6—6 in FIGURE 5, but on an enlarged scale.

During normal driving operation, the cams are axially closed together, as shown in FIGURE 2, and rotate as a unit along with the shafts 15 and 20.

As will now be described, means are provided for causing cam 40 to cease rotating and thereby shift cam 50 axially and axially shift the clutch element 17 out of driving engagement with element 21. In other words, relative rotation between the cams causes axial separation due to their complementary inclined surfaces moving over one another.

Mounted directly beneath the stop cam 40 is a pivoted lever 55 mounted on its hub 56 in a bifurcated bracket 57 which in turn is secured to the wagon frame F. An arm 58 is also welded to the hub and has a trip chain 59 secured to its free end. Also secured to the free end of the arm is a return spring 60 which biases the lever 55 to be swung upwardly against the lugs of the stop cam. As soon as a lug engages the end of the lever, the power is interrupted due to immediate axial separation of the clutch cam elements 40 and 50, and the beater and longitudinal conveyor in the wagon also stop immediately.

The means for actuating the lever takes the form of a trip bar 70 which is swingably mounted by its arms 72 and 73 in the side walls of the wagon. A third arm 74 is welded intermediate the length of the trip bar and the other end of the chain 59 is fastened to the free end of this arm.

Any slight rearward pushing on the trip bar acts to swing the free end of arm 74 upwardly, carrying with it the lever 55, and it is only necessary to swing the trip bar slightly to the rear to thus effect disengagement of the clutch.

It will be noted that the arms of the trip bar extend generally vertically and this is for the purpose of preventing accidental rearward swinging of the bar, as when being struck by a bale of hay or the like which may be thrown into the front end of the wagon. In other words, by having the swingable arms extend normally in a generally vertical position, any bale or other object landing on top thereof will not cause rearward swinging of the bar.

In order to actuate the bar from the side of the wagon, a rearwardly extending lever 76 is secured to the pivot shaft 77 of arm 72. Thereby an operator standing at the side of the wagon can also immediately disengage the beater simply by pushing downwardly on the rearwardly extending lever 76.

In order to again re-engage the clutch, it is only necessary to manually swing the arm 58 forwardly to thereby remove the lever 55 from its holding engagement against the lug on the stop cam.

*Résumé*

With the present invention, the drive to the inherently dangerous parts of the wagon can be immediately interrupted from any location adjacent the front end of the wagon. The action of the declutching unit is positive and immediate. In order to re-engage the drive, it is only necessary to swing the arm forwardly, thus again effecting drive to the entire wagon, and without stopping the power source or cross conveyor.

Various modes of carrying out the invention are contemplated as being within the scope of the following claims particularly pointing out and distinctly claiming the subjected matter which is regarded as the invention.

What I claim is:

1. A declutching device for a self-unloading wagon of the type having rotatably driven parts, a power shaft for driving said parts, and a clutch for said power shaft, said clutch having a pair of disengageable elements, said device comprising a pair of tubular cams mounted on and around the outside of at least one of said elements and having complementary cam surfaces, said cams being rotatable with and enclosing said elements in normal drive operation, one of said cams abutting against one of said elements for shifting the latter to a clutch disengaged position, means for stopping rotation of the other of said cams to thereby cause relative rotation between said cams and consequently shifting one cam and its associated element to a clutch disengaging position.

2. A declutching device for a self-unloading wagon of the type having rotatably driven parts, a pair of co-axially aligned power shafts for driving said parts, and a clutch between said power shafts and carried thereby, said clutch having a pair of disengageable elements, one fixed to each of said shafts, one of said elements being axially shiftable out of driving engagement with the other element, said device comprising a pair of tubular cams mounted on and around the outside of at least one of said elements and having complementary and opposed cam edges said cams being rotatable with and enclosing said elements in normal driving operation, one of said cams abutting against one of said elements for axial shifting of the latter to a clutch disengaged position, means for stopping rotation of the other of said cams to thereby cause relative movement between said cam edges and consequently axial shifting of said one cam and its associated element to a clutch disengaging position.

3. A declutching device for a self-unloading wagon having rotatably driven parts, a pair of co-axially aligned power shafts for driving said parts, a clutch between said shafts and having a disengageable element rotationally fixed to each of said shafts, a pair of tubular cams mounted on and around the outside of at least one of said elements and having complementary cam surfaces, said cams being rotatable with and enclosing said elements in normal drive operation, one of said cams being in driving engagement with one of said elements and axially shiftable therewith to a clutch disengaged position, a stop lug on the periphery of the other of said cams, and releasable lever means shiftably mounted on said wagon and abuttable against said lug to thereby stop rotation of said other cam and causing relative rotation between said cams and consequent axial shifting of said cam and its associated element to a clutch disengaging position.

4. A device as defined in claim 3 including a trip bar swingably mounted on said wagon, and a connecting member between said bar and said lever whereby shifting of said bar swings said lever into engagement with said lug.

5. A declutching device for a self-unloading wagon having a pair of co-axially aligned power shafts, a disengageable clutch element rotationally fixed to each of said shafts for rotation therewith, a pair of tubular cams mounted on and around the outside of at least one of said elements and having complementary cam surfaces, one of said cams being rotatably mounted on one of said elements, the other of said cams being in driving engagement with the other of said element for shifting the latter to a clutch disengaged position, said cams enclosing said elements, means for stopping rotation of said one cam to thereby cause relative rotation between said cams and consequent axial shifting of said other cam and its associated element to a clutch disengaging position.

References Cited in the file of this patent

UNITED STATES PATENTS

| | | |
|---|---|---|
| 1,472,815 | Schimek | Nov. 6, 1923 |
| 2,060,175 | Carleton | Nov. 10, 1936 |
| 2,513,453 | Conner | July 4, 1950 |
| 2,677,447 | Johnson | May 4, 1954 |
| 3,106,998 | Walker | Oct. 15, 1963 |